MULTIPLIER CIRCUIT

Filed Jan. 26, 1961

INVENTOR
HERBERT B. BASKIN
BY *Roy C. Hopgood*
ATTORNEY 3,052,412

MULTIPLIER CIRCUIT

Herbert B. Baskin, Peekskill, N.Y., assignor to International Business Machines Corporation, New York, N.Y., a corporation of New York Filed Jan. 26, 1961, Ser. No. 85,044
6 Claims. (Cl. 235—164)

This invention, generally, relates to multiplier circuits and, more particularly, to a new and improved binary multiplier circuit.

It is known to use binary multiplier circuits in computer devices to simplify otherwise complex operations and to make such computer devices attractive economically. However, the multiplier circuits that have been developed in the past have emphasized speed in operation, and as a result, those multiplier circuits have not always been compatible with efforts to minimize costs.

There is a definite need for computer devices that perform complex operations automatically but where speed is not a significant factor, such as for example, in process control systems, inventory systems and the like. With speed reduced to a less significant factor, the cost of computer devices can be reduced substantially, and since binary multiplier circuits are useful in these computer devices, it is extremely desirable if the cost of these circuits could be reduced also and still maintain their high degree of reliability and accuracy.

Accordingly, it is an object of the invention to provide a binary multiplier circuit that admits of greater economy in manufacture but which maintains a high degree of reliability and accuracy in operation.

Another object of the invention is to provide a new and improved multiplier circuit.

Still another object of the invention is to provide a multiplier circuit having a minimum of operable component parts.

A further object of the invention is to provide a circuit arrangement for storing multiplicand and multiplier information to provide a multiplication product.

In one of its aspects, the invention is characterized by an information storage means which is connected to condition a gate means in accordance with information stored in the storage means so that a selected one or ones of a plurality of pulse groups is connected to an output of the gate means. Each of the pulse groups has a different predetermined characteristic relationship with a series of clock pulses; such as for example, each pulse group is at a different multiple frequency of the basic clock pulse frequency. In addition to the above, means is provided to limit the number of pulses in the selected group or groups to reach the output of the gate means. This arrangement permits the information in the storage means to represent, for example, the multiplicand and the means to limit the total number of pulses to reach the output to represent the multiplier, whereby the sum of the pulses at the output represents the product.

The foregoing and other objects, features and advantages of the invention will be apparent from the following more particular description of a preferred embodiment of the invention, as illustrated in the accompanying drawings.

Figure 1:
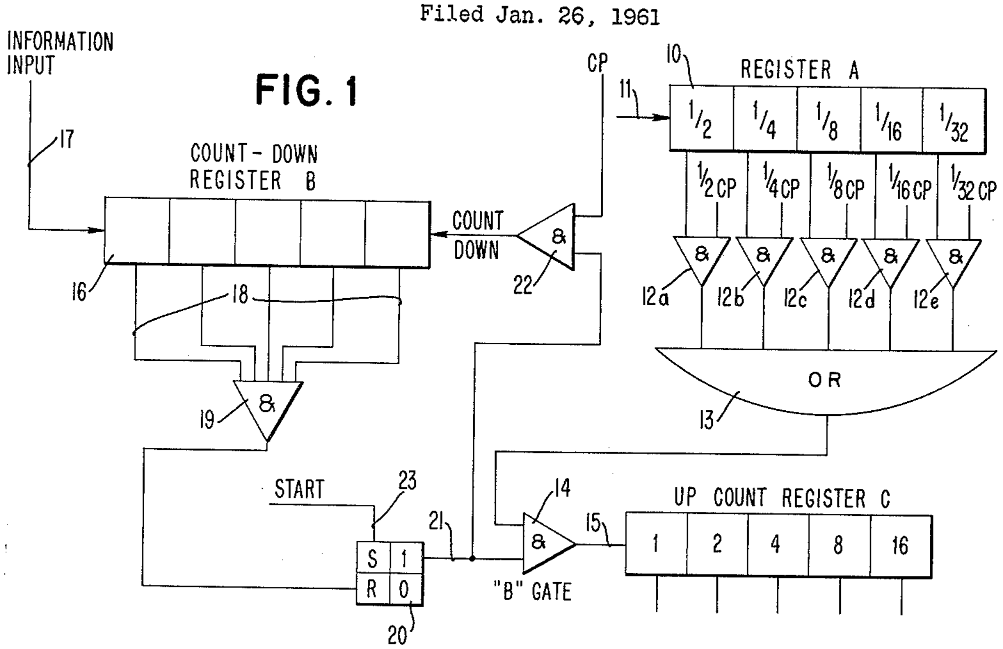
FIG. 1 is a circuit diagram illustrating an arrangement in accordance with the invention.

Referring now to a preferred form of the invention, as illustrated in FIG. 1 of the drawings, a first register 10, identified also as "Register A," stores information in digital form in respective stages, identified arbitrarily by the fractions ½, ¼, ⅛, 1/16 and 1/32 representing a frequency relationship with a timed series of clock pulses. Information is read into the register A at a suitable input 11, depending upon the type of register, i.e., shift, parallel, etc., to "set" selected stages so that a predetermined one or more of a plurality of AND gates 12*a*, 12*b*, 12*c*, 12*d* and 12*e* will be conditioned to permit the particular group of pulses connected therewith to pass through to an OR circuit 13.

An AND gate 14 provides an output over a connection 15 to a suitable UP Count Register C for each pulse in the selected one or more of the pulse groups, so long as the gate 14 is "conditioned" by information stored in a second register 16. The AND gate 14 is identified in FIG. 1 also by the designation "B" gate, and the second register 16 is identified also as "Register B."

The Register B preferably is of a suitable countdown type (or an UP count register wherein the complement of a desired number is fed in) to provide a pulse output after a predetermined number of clock pulse intervals, and the information concerning the desired number of intervals is read into the Register B at an input connection 17. After the desired number of clock pulse intervals, the Register B provides an output pulse over one of the connections 18, through an AND gate 19 to reset a bistable device or a set-reset relay 20, thereby discontinuing the "conditioned" state of the "B" gate and interrupting the series of pulses being delivered at the output connection 15.

To start the multiplier circuit, a "start" signal is applied to "set" the relay (bistable device or trigger circuit) 20 and provide a "conditioning" signal to a connection 21 for application to the "B" gate and to initiate the countdown of the Register B through an AND gate 22, which is conditioned by the clock pulses from a suitable source (not shown). There are available many and varied types of circuits to provide a series of clock pulses and, also, a plurality of pulse groups each bearing a predetermined frequency relationship with the frequency of the clock pulses.

The operation of the multiplier circuit of the invention is illustrated best by demonstrating with an actual example, such as multiplying the whole number 16 (the multiplicand) by the fraction ⅝ (the multiplier) to obtain the product 10 in the Register C. In accordance with the invention, both the multiplicand and the multiplier are stored, for example, as binary information in the Registers A and B.

To store the fraction ⅝ in the Register A in binary form, the stages identified as ½ and ⅛ are "set" or "turned on" to provide a conditioning output to the AND gates 12*a* and 12*c*, respectively. The stages ½ and ⅛ are selected since ½+⅛=⅝, and this is expressed in binary form as 1 0 1 0 0 for the Register A.

With the AND gates 12*a* and 12*c* conditioned, only the pulses in the ½ CP and ⅛ CP groups or trains are delivered through the OR gate 13 to the "B" gate. The abbreviation "CP" represents "Clock Pulse," and therefore, ½ CP represents a group of pulses having a frequency of ½ the clock pulse frequency.

Figure 2:
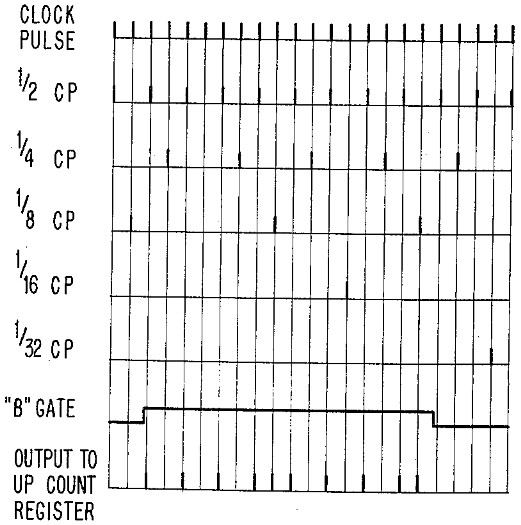
FIG. 2 is a timing diagram showing respective pulse groups and a selected number of groups in accordance with the invention.

Similarly, the expression ⅛ CP represents another group of pulses and this group has a frequency of ⅛ the clock pulse frequency. The relationship of the respective pulse groups to the basic clock pulses is illustrated in FIG. 2 of the drawings.

Now, with the ½ CP and ⅛ CP pulse groups available at the "B" gate, the "B" gate is turned on for 16 clock pulse intervals, as determined by the information stored in the Register B. To turn on the "B" gate, a Start signal is applied at terminal 23 to "set" the relay 20 and provide a conditioning level voltage over the connection 21 to "open" the "B" gate and, at the same time to initiate the countdown by the Register B.

When the sixteenth clock pulse interval is reached by the Register B, as determined by the presetting of this register, a signal is provided through the gate 19 to "reset" the relay 20 and, thus, terminate the conditioning voltage level applied to the "B" gate. Therefore, when this is done, all those pulses in the ½ and ⅛ pulse groups which have appeared during the 16 clock pulse interval have been counted by the UP Count Register C.

The stages 2 and 8 of the Register C will provide signal outputs indicating the total "10," which is the product of ⅝×16. In binary form and reading the Register C from left to right, the binary product is 0 1 0 1 0.

FIG. 2 of the drawings shows the above-described example in graphic form. The length of the "B" gate pulse extends for sixteen clock pulse intervals, in accordance with the information stored in the Register B, and as explained previously, only the ½ CP and ⅛ CP pulse groups are selected by the information stored in the Register A. Therefore, a count of the ½ CP and ⅛ CP pulses during the interval of the "B" gate pulse reveals a total count of 10 pulses, as seen on the bottom line of the illustration in FIG. 2 and as labeled "Output to Up Count Register."

It will be understood readily that for the binary rate multiplier circuit of the invention to function properly, no two pulses in the ½ CP, ¼ CP, ⅛ CP, etc., pulse groups must be permitted to coincide in time. This is because the Register C must receive pulses one at a time so that it can count each as part of the total.

The separation of the pulses between each respective timing pulse group is achieved merely by interconnecting successive stages of a timing pulse generator circuit so that the carry-over from one stage to the next is out of phase with the preceding stage. Since pulse generator circuits of this nature are well known, further detailed description of this component part is believed to be unnecessary.

The basic binary multiplier circuit described in detail above and its variations may be used to perform a series of multiplications in which the output of one multiplier circuit is fed directly into another. In this connection, the Register C which indicates the output for one multiplier circuit can function as the Register A input information element for another multiplier circuit.

Of course, it becomes obvious now that variations in the particular types of information storage elements are suggested for the Registers A, B and C.

Figure 3:
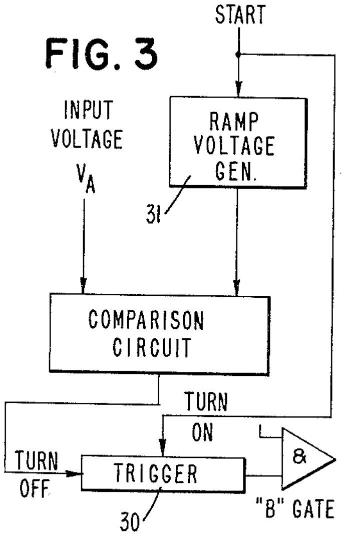
FIG. 3 is a circuit arrangement to provide an alternative means to limit the number of pulses in selected groups.
Figure 4:
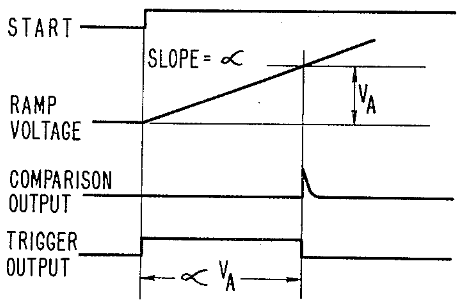
FIG. 4 is a timing pulse diagram for the circuit shown in FIG. 3.

Referring to FIGS. 3 and 4 by way of example, the "B" gate may be turned on and off by a trigger circuit 30 which can be connected to be responsive to various conditions. For example, a start signal which is applied to turn the trigger circuit 30 on is applied also to initiate a ramp voltage generator 31.

The ramp voltage generator 31 is adjustable to control the slope $\alpha$ of the voltage which is generated, and therefore, the length of time measured in clock pulse intervals is adjustable before a predetermined voltage level $V_A$ is reached. The output of the ramp voltage generator 31 is connected to a voltage comparison circuit 32 for comparison with the preset voltage level $V_A$ so that an output pulse is delivered to turn the trigger circuit 30 off when the value of the ramp voltage reaches the value of $V_A$. This is illustrated in FIG. 4 of the drawings.

Thus, the circuit of the invention is less expensive than an analog multiplier of equal precision, and its precision may be increased beyond that available with analog multipliers.

While the invention has been particularly shown and described with reference to preferred embodiments thereof, it will be understood by those skilled in the art that various changes in form and details may be made therein without departing from the spirit and scope of the invention.

What is claimed is:

1. A multiplier circuit for multiplying a first number by a second number to produce an output signal proportional to the product thereof, said multiplier circuit comprising a source of clock pulses having a fixed repetition rate, logic block means including means for producing a predetermined number of pulse trains at a repetition rate corresponding to a preset fraction of said clock pulse repetition rate, means for applying signals corresponding to said first number to said logic block means, said logic block means producing an output train of pulses in response to said signals, the pulse rate thereof being related to said first number, first gating means, means for applying the output from said logic block means to said first gating means, an enabling circuit having its output coupled to said first gating means, means for applying signals corresponding to said second number to said gate enabling circuit, the enabling circuit producing an enabling pulse in response to said latter mentioned signals having a duration related to said second number and counting means coupled to the output of said first gating means for producing a signal corresponding to the product of said first and second numbers.

2. The combination defined in claim 1, wherein said logic block means comprises binary register means adapted to receive binary input signals representing said first number, a plurality of AND circuits each having two input terminals and an output terminal, one input terminal of each AND circuit being coupled to a corresponding stage of said binary register means, the other input terminal of each AND circuit being adapted to receive one of said pulse trains, the repetition rate of said pulse trains at each of said AND circuits being a different function of said fixed repetition rate, and an OR circuit having a plurality of input terminals and an output terminal, each input terminal of said OR circuit being coupled to the output terminals of said AND circuits, and the output terminal of said OR circuit producing said output train of pulses.

3. The combination defined in claim 2, wherein said gate enabling circuit comprises a control counter circuit containing first and second input means and output means, means for applying said signals corresponding to said second number to the first input means of said control counter, means for applying said clock pulses to the second input means, second gating means in said second input means for controlling the application of clock pulses to said control counter, bistable switch means having first and second input terminals and an output terminal, said bistable switch means being adapted to assume ON and OFF states in response to signals applied to said first and second input terminals respectively, said second input terminal of said bistable switch means being coupled to the output means of said control counter, the output terminal of said bistable switch means being coupled to said first and second gating means, and said first input terminal of said bistable switch means being adapted to receive a start input signal to switch said switch means to the ON state, thereby enabling said first and second gating means and admitting said output train of pulses to said output counter and said clock pulses to said control counter for a time period proportional to the duration of the signal corresponding to said second number.

4. The combination defined in claim 1, wherein said enabling circuit comprises a voltage comparison circuit having two input terminals and an output terminal, said voltage comparison circuit being adapted to produce an output signal when the voltages applied to said two input terminals are equal, one input terminal of said voltage comparison means being adapted to received an input voltage corresponding to said second number, a ramp voltage generator coupled to the other input terminal of said voltage comparison circuit, said ramp voltage generator being adapted to produce a ramp voltage output when triggered by a start signal applied thereto, bistable switch means having two input terminals and an output terminal, said bistable switch means being adapted to be turned ON by a signal applied to said first input terminal thereof and to be turned OFF by a signal applied to said second input terminal thereof, said first input terminal of said bistable switch means being coupled to said start input signal and said second input terminal thereof being coupled to the output terminal of said voltage comparison circuit, and the output terminal of said bistable switch means being coupled to said first gating means to enable said first gating means for a time period related to said second number.

5. The combination defined in claim 4, wherein the slope of said ramp voltage output is equal to X volts per clock pulse period, where X is the number of volts representing one unit of said second number.

6. A multiplier for generating a sequence of output signals whose number is indicative of the product of two factors, said multiplier comprising in combination: a plurality of clock pulse signal sources, each of said clock pulse signal sources having a different frequency where each frequency except for the lowest frequency is an integral multiple of the lowest frequency; and means responsive to said clock pulse signal sources and to said factors for generating said sequence of output signals, said means being operable to select the clock pulse signal sources which contribute to said sequence of output signals in response to one of said factors, and said means being operable to control the duration of time during which said clock pulse signal sources contribute to said sequence of output signals in response to said other factor.

References Cited in the file of this patent

UNITED STATES PATENTS

| | | |
|---|---|---|
| 2,910,237 | Meyer et al. | Oct. 27, 1959 |
| 2,913,179 | Gordon | Nov. 17, 1959 |
| 2,926,848 | Gordon | Mar. 1, 1960 |